United States Patent
Chai et al.

(10) Patent No.: US 9,840,968 B2
(45) Date of Patent: Dec. 12, 2017

(54) TOPOLOGIES AND METHODS FOR TURBINE ENGINE START INVERTERS

(71) Applicant: Hamilton Sundstrand Corporation, Charlotte, NC (US)

(72) Inventors: Harry H. Chai, Caledonia, IL (US); Waleed M. Said, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/856,442

(22) Filed: Sep. 16, 2015

(65) Prior Publication Data

US 2017/0074168 A1  Mar. 16, 2017

(51) Int. Cl.
| | |
|---|---|
| F02C 7/26 | (2006.01) |
| H02P 27/08 | (2006.01) |
| H02M 1/14 | (2006.01) |
| H02M 1/00 | (2006.01) |
| H02M 7/483 | (2007.01) |
| H02M 7/487 | (2007.01) |

(52) U.S. Cl.
CPC .............. *F02C 7/26* (2013.01); *H02M 1/00* (2013.01); *H02M 1/14* (2013.01); *H02M 7/483* (2013.01); *H02M 7/487* (2013.01); *H02P 27/08* (2013.01); *F05D 2260/85* (2013.01)

(58) Field of Classification Search
CPC . F02C 7/26; H02P 6/14; H02M 7/487; H02M 1/14; H02M 7/483
USPC .................................................. 363/98, 132
See application file for complete search history.

(56) References Cited

U.S. PATENT DOCUMENTS

| | | | |
|---|---|---|---|
| 5,734,931 A | 3/1998 | Inoue et al. | |
| 5,751,138 A * | 5/1998 | Venkata | H02J 3/01 323/207 |
| 6,333,569 B1 | 12/2001 | Kim | |
| 6,701,081 B1 | 3/2004 | Dwyer et al. | |
| 7,109,681 B2 | 9/2006 | Baker et al. | |
| 7,495,938 B2 | 2/2009 | Wu et al. | |
| 7,746,024 B2 | 6/2010 | Rozman et al. | |
| 7,821,145 B2 | 10/2010 | Huang et al. | |
| 8,659,925 B2 | 2/2014 | Sagona | |
| 8,708,891 B2 | 4/2014 | Sjostrom et al. | |
| 8,786,232 B2 | 7/2014 | Chai et al. | |
| 8,982,587 B2 | 3/2015 | Nguyen et al. | |
| 2003/0048651 A1 * | 3/2003 | Trimble | H02M 7/2173 363/125 |
| 2011/0141779 A1 * | 6/2011 | Joseph | H02M 7/487 363/95 |

(Continued)

FOREIGN PATENT DOCUMENTS

| | | |
|---|---|---|
| JP | 5341355 B2 | 12/1993 |
| JP | 2003066513 A | 3/2003 |

*Primary Examiner* — Adolf Berhane
*Assistant Examiner* — Bart Iliya
(74) *Attorney, Agent, or Firm* — Locke Lord LLP; Scott D. Wofsy; Christopher J. Cillié

(57) ABSTRACT

A start inverter for an electric engine start scheme includes an inverter phase leg with solid-state switches and a pulse width modulator operatively connected to the solid-state switches of the inverter phase leg. The pulse width modulator provides command signals to the solid-state switches of the inverter phase leg to invert direct current into alternating current with less ripple than a start inverter with two solid-state switches per phase leg.

19 Claims, 11 Drawing Sheets

(56) References Cited

U.S. PATENT DOCUMENTS

| | | | |
|---|---|---|---|
| 2011/0291737 A1* | 12/2011 | Kshirsagar | H02M 7/217 327/426 |
| 2012/0099349 A1* | 4/2012 | Sagona | H02M 1/4233 363/45 |
| 2013/0021684 A1 | 1/2013 | Miyamoto et al. | |
| 2014/0307489 A1* | 10/2014 | Kidera | H02M 7/487 363/40 |
| 2015/0155804 A1 | 6/2015 | Sakai | |
| 2015/0200602 A1* | 7/2015 | Narimani | H02M 5/4585 363/37 |
| 2016/0118910 A1* | 4/2016 | Torrico-Bascop | H02M 7/487 363/131 |
| 2016/0218557 A1* | 7/2016 | Cinti | H02M 1/32 |

* cited by examiner

TOPOLOGIES AND METHODS FOR TURBINE ENGINE START INVERTERS

BACKGROUND OF THE INVENTION

1. Field of the Invention

The present disclosure relates to power conversion, and more particularly to start inverters for electric engine starters.

2. Description of Related Art

Aircraft engines are commonly started by non-electrical devices such as start turbines powered by compressed air. New generations of "More Electric" aircraft in recent years employ electric engine starters which operate the engine generator in a motoring mode powered using power provided by a start inverter. Because aircraft engine generators are designed mainly for operating in generating mode, the engine generator is typically not optimized for engine starting. In general, sub-transient reactance associated with the starter generator may present low impedance to the start inverter and draw relatively high levels of ripple current from the engine start inverter. Normally the solid-state switching devices, power capacitors, and other start inverter components are sized to accommodate the ripple current, higher ripple currents tending to require start inverters with larger components.

Such conventional starter inverter systems and related methods have generally been considered satisfactory for their intended purpose. However, there is still a need in the art for improved inverters that allows for reduced ripple current during electric engine starts. The present disclosure provides a solution for this need.

SUMMARY OF THE INVENTION

A start inverter for a gas turbine engine includes a plurality of three-level inverter phase legs and a pulse width modulator operatively connected to the three-level inverter phase legs. The pulse width modulator is configured to provide command signals to the solid-state switches of the inverter phase leg to invert direct current (DC) power into alternating current (AC) power with less ripple than start inverters having two-level inverter phase legs.

In certain embodiments, the start inverter can include a plurality of three-level inverter phase legs. The peak current of the AC power can be substantially equivalent to the peak of the fundamental current of the AC power. It is contemplated that the AC power fundamental current flow can be substantially equivalent to the current rating for the start inverter, e.g., about 1 PU, thereby maximizing the torque provided by a starter-generator in motoring mode for the current rating.

In accordance with certain embodiments, the pulse width modulator can include a carrier wave module, a reference wave module, and a command signal generator module that are communicative with one another. The carrier wave module can be configured to provide a plurality of carrier waves to the command signal generator. The reference wave module can be configured to provide a sinusoidal phase reference signal to the command signal generator. The command signal generator can be configured to compare the sinusoidal phase reference signal to each of the plurality of carrier signals, and derive command signals for the solid-state switches using the plurality of carrier waves and the sinusoidal phase reference signal. For example, the command signal generator can apply a phase disposition (PD) or a phase opposite disposition (POD) modulation technique to the received waves to derive the command signals for the solid-state switch devices of the phase legs.

It is also contemplated that, in accordance with certain embodiments, the inverter phase legs can be connected between input DC leads and output AC leads that are connected to the solid-state switches of the phase legs. The AC leads can include an A-phase output lead, a B-phase output lead, and a C-phase output lead. The DC leads can include a positive DC lead, a midpoint DC lead, and a return DC lead that are connected to the solid-state switches of the phase legs. A first of the solid-state switches can be connected in series between the positive DC lead and the AC lead. A second of the solid-state switches can be connected through the midpoint DC lead and the AC lead. A third of the solid-state switches can be connected in series between the return DC lead and the AC lead. The solid-state switches can include field effect transistors (i.e. FETs), insulated gate bipolar transistors (i.e. IGBTs), or any other suitable type of solid-state switch devices.

It is further contemplated that an emitter of the first solid-state switch can be connected to a collector of the second solid-state switch, and a diode can be connected between the midpoint DC lead and both the emitter of the first solid-state state switch and the collector of the second solid-state switch. A fourth solid-state switch can be connected between the second solid-state switch and the third solid-state switch with the AC lead connected between the second and fourth solid-state switches. An emitter of the fourth solid-state switch can be connected a collector of the third solid-state switch, and a diode can be connected between the collected and the fourth solid-state switch that is configured to oppose current flow from the midpoint DC lead. An emitter of the first solid-state switch can be connected to a collector of the second solid-state switch, and a diode can be connected to the collector and the emitter to allow current flow from the midpoint DC lead.

In further embodiments the midpoint DC lead can be connected in series with the AC lead through the third solid-state switch. A fourth solid-state switch can be connected in series between the third solid-state switch and the AC lead. An emitter of the second solid-state switch can be connected to a collector of the fourth solid-state switch. A collector of the second solid-state switch can be connected to an emitter of the fourth solid-state switch. It also contemplated that the start inverter can include four diodes, a first of the diodes connected to the mid-point DC lead and arranged to oppose current flow from the both the second solid-state switch and the AC lead to the mid-point DC lead, a second of the diodes connected to the mid-point DC lead and arranged to oppose current flow from the mid-point DC lead to both the second solid-state switch and the AC lead, a third of the diodes connected to the AC lead and arranged to oppose current flow both the mid-point DC lead and the second solid-state switch to the AC lead, and a fourth of the diodes connected to the AC lead and arranged to oppose current flow from the AC lead into both the solid-state switch and the mid-point DC lead.

A method of providing power to a starter-generator for an electric engine start includes receiving three-level DC power, inverting the DC power into AC power, and applying the AC power to starter-generator lead. In certain embodiments, the DC power can be inverted into AC power by comparing a reference wave to a plurality of carrier waves to generate command signals for solid-state switches of an inverter stage. Inverting the DC power can include applying a PD modulation derive the command signals. Inverting the DC power can include applying a POD modulation to derive the command signals.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 3:
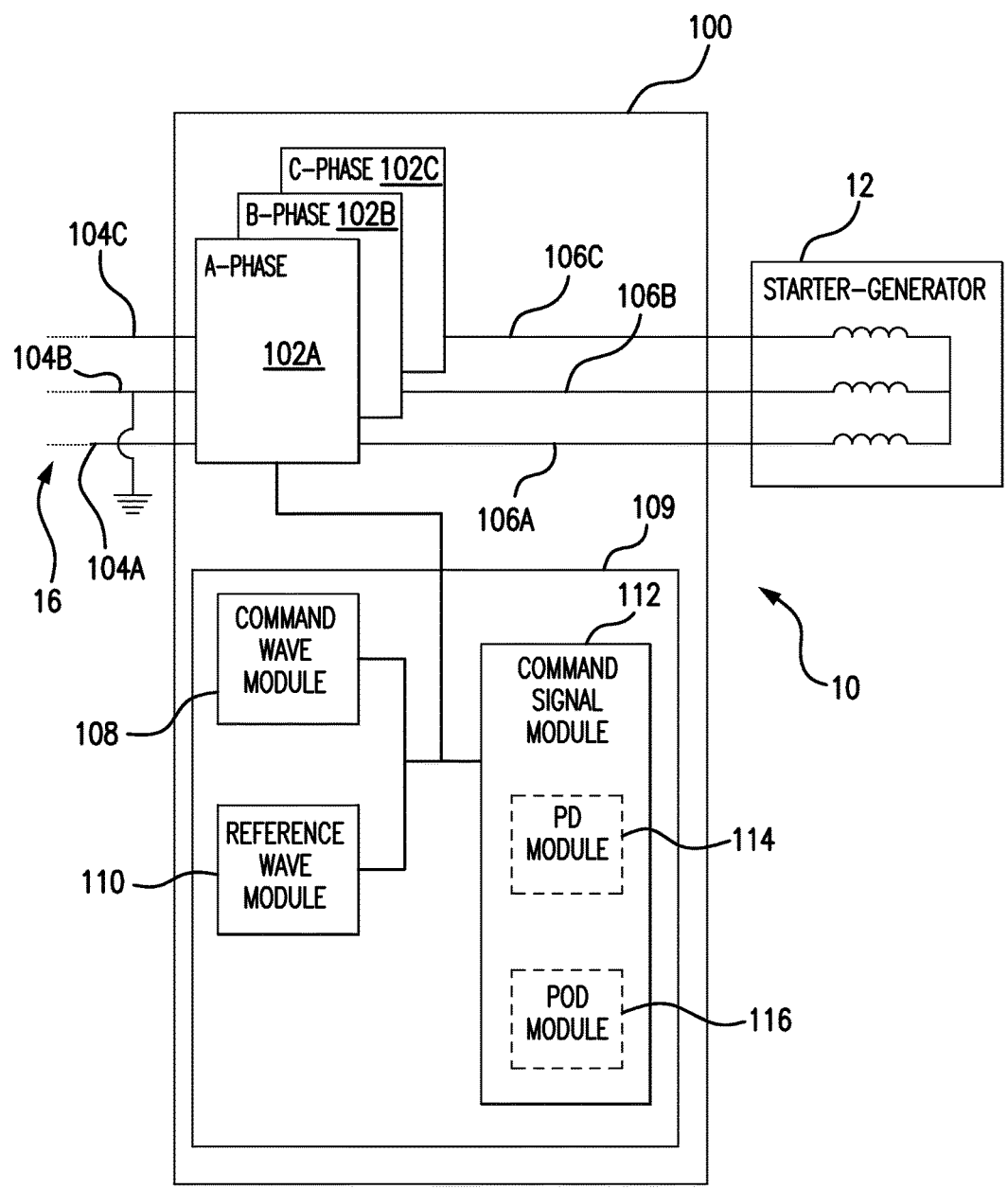
FIG. 3 is a schematic diagram of a start inverter for a gas turbine engine according to the present disclosure, showing a pulse width modulator connected to a three-level start inverter.

Reference will now be made to the drawings wherein like reference numerals identify similar structural features or aspects of the subject disclosure. For purposes of explanation and illustration, and not limitation, a partial view of an exemplary embodiment of a start inverter in accordance with the disclosure is shown in FIG. 3 and is designated generally by reference character 100. Other embodiments of start inverters and methods of providing power to starter generators for gas turbine engines in accordance with the disclosure, or aspects thereof, are provided in FIGS. 4-8, as will be described. The systems and methods described herein can be used to provide power to gas turbine engine starter-generators, such as in aircraft engines.

Figure 1:
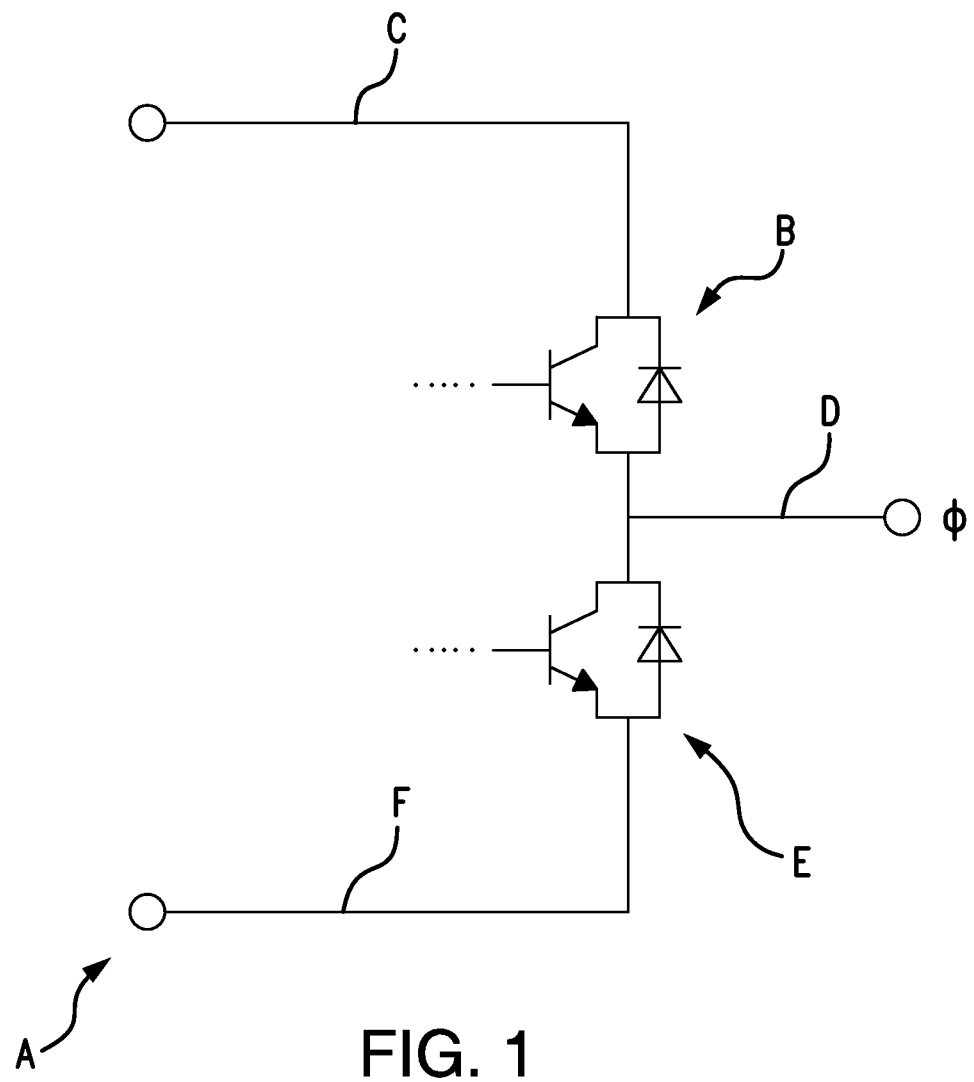
FIG. 1 is circuit diagram of a two-level inverter, showing solid-state switches connected between direct current (DC) leads and an alternating current (AC) lead.

With reference to FIG. 1, a two-level inverter is generally referred to with reference letter A. Two-level inverter A includes a first solid-state switch device B arranged in series between a positive direct current (DC) power lead C and an alternating current (AC) power lead D. A second solid-state switch device E is arranged in series between a return DC lead F and AC power lead D.

Figure 2A:
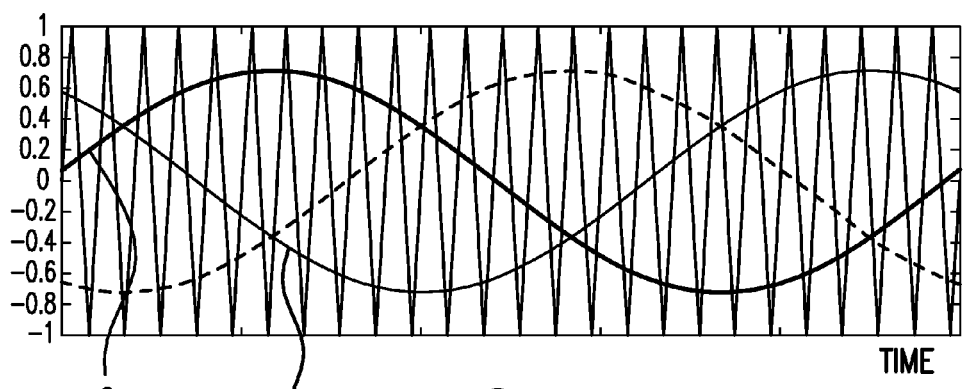
FIGS. 2A-2C are graphs of a triangle wave, reference wave, command signals, and output AC power, respectively, of the two-level inverter of FIG. 1, showing ripple in AC output.
Figure 2B:
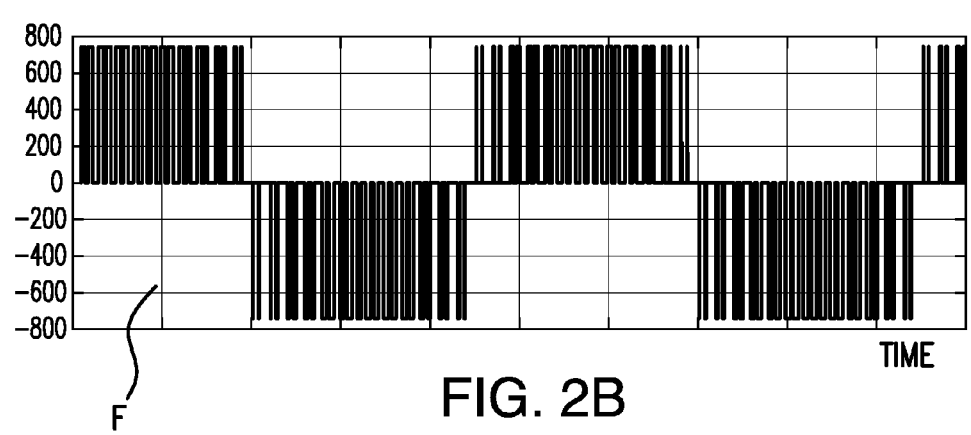
Figure 2C:
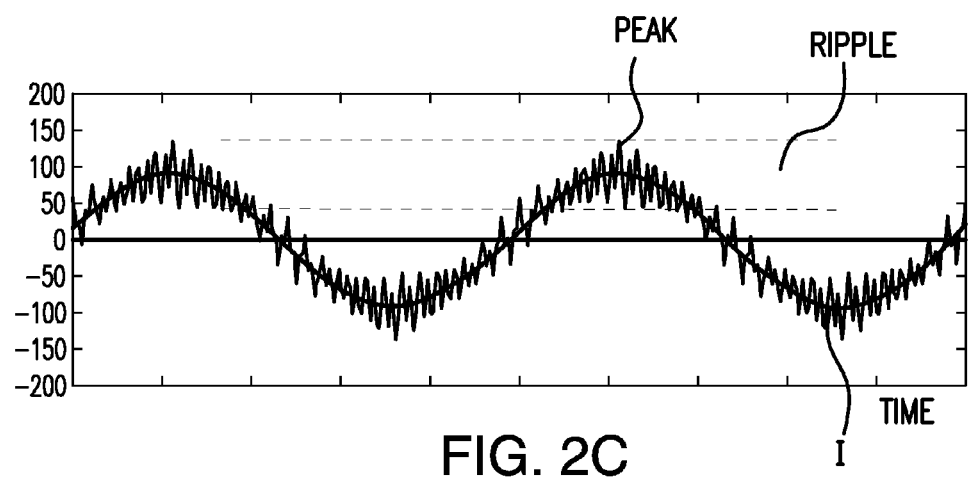

Referring to FIGS. 2A-2C, first solid-state switch device B (shown in FIG. 1) and second solid-state switch device E (shown in FIG. 1) may each be toggled between an on-state and an off-state according to a command waveform F, shown in FIG. 2B, received at their respective gates. Command waveform F is derived from a triangle wave G and reference wave H, each shown in FIG. 2A, that change over time. Depending on the difference between triangle wave G and reference wave H, first solid-sate switch device B and second solid-state switch device E open and close to synthesize input two-level DC power into AC power with a waveform I (shown in FIG. 2C) that oscillates according to a fundamental waveform. Waveform I includes ripple, which is added to both the minima and maxima of AC power waveform I. In the illustrated exemplary waveform I, ripple comprises about half (50%) of the magnitude of fundamental waveform. This requires that the ripple current be reduced by two-thirds (67%). As will be appreciated, reducing the peak amplitude of the fundamental waveform reduces the amount of current that two level inverter A can provide to a starter-generator in certain applications.

Referring to FIG. 3, a starter-generator system is shown is generally indicated with reference numeral 10. Starter generator system 10 includes a starter-generator 12 connected to a DC link 16 by multilevel start inverter 100 which, in the illustrated exemplary embodiment is a three-level start inverter. Start includes a plurality of phase legs 102 that are each connected to a plurality of DC leads 104 and a respective phase lead 106. In this respect DC link 16 is connected to a source DC lead 104A, a midpoint DC lead 104B, and a return DC lead 104C. Phase A leg 102A is connected between source DC lead 104A, midpoint DC lead 104B, and return DC lead 104C and AC phase lead 106A. Phase B leg 102B is connected between source DC lead 104A, midpoint DC lead 104B, and return DC lead 104C and phase B leg 106B. Phase C leg 102C is connected between source DC lead 104A, midpoint DC lead 104B, and return DC lead 104C and phase C leg 106C.

Start inverter 100 includes a pulse width modulator 109 with carrier wave module 108, a reference wave module 110, and a command signal module 112. Carrier wave module 108 is communicative with command signal module 112 and is configured to provide a plurality of carrier wave signals to command signal module 112 that, in the illustrated exemplary embodiment, are triangle waves. Reference wave module 110 is also communicative with command signal module 112 is configured to provide a sinusoidal phase reference signal to command signal module 112. Command signal module 112 is configured to receive the plurality of carrier wave signals provided by carrier waveform module 108 and the phase reference signal provided by reference wave module 110, and to derive therefrom a command signal for solid-state switch devices included in the phase legs of start inverter 100. For example, command signal generator may include a phase disposition (PD) module 114 to derive command signals for the solid-state switch devices. Command may include a phase opposite disposition (POD) module to derive command signals for the solid-state switch devices.

Figure 4A:
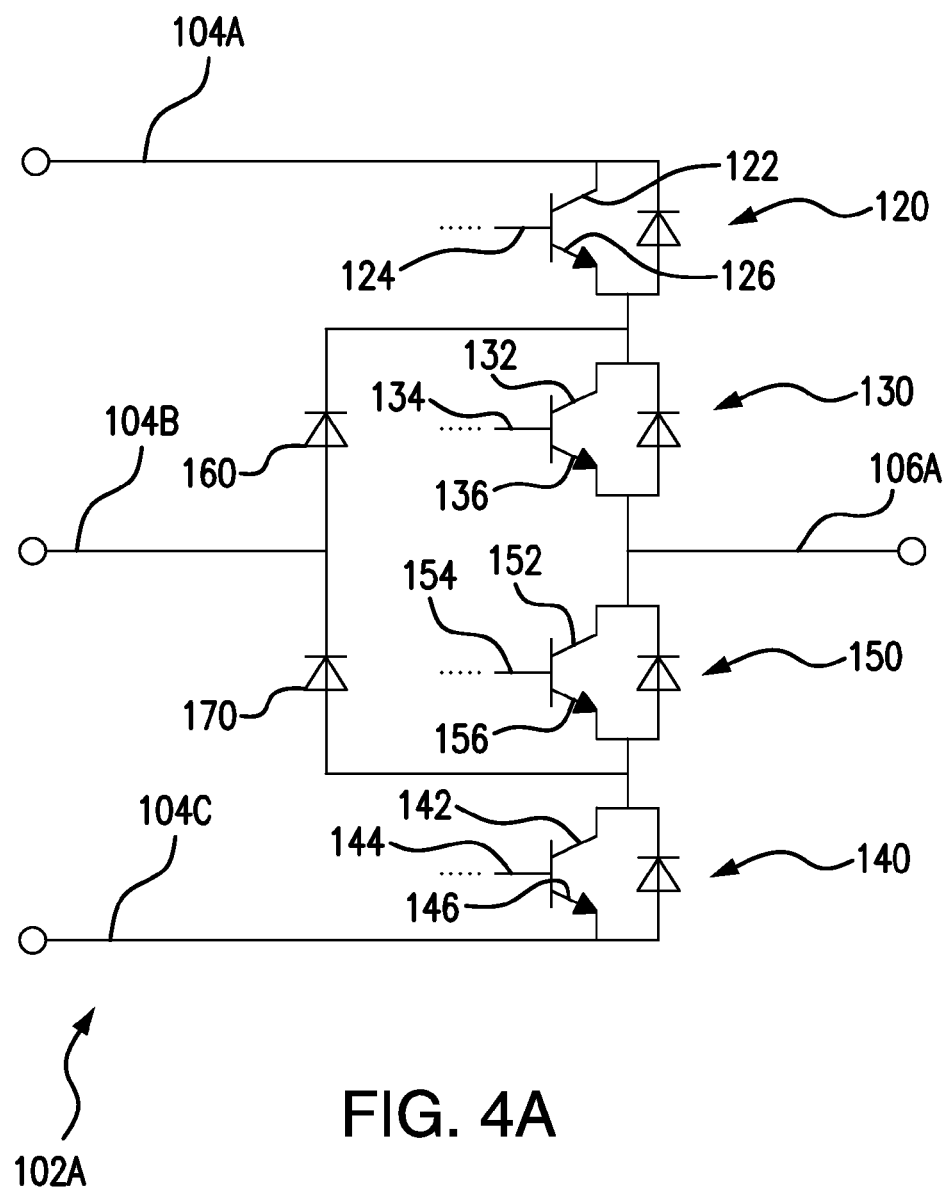
FIG. 4A-4D are circuit diagrams of three-level start inverters, showing four respective contemplated arrangements of start inverters coupled between DC leads and an AC phase lead.

Referring to FIG. 4A, phase leg 102A is shown according to an embodiment. Phase leg 102A includes a first solid-state switch device 120, a second solid-state switch 130, a third solid-state switch 140, and a fourth solid-state switch device 150, each of which are illustrated in an exemplary manner in FIG. 4 as insulated gate bipolar transistor (IGBT) devices. First solid-state switch 120 includes a collector 122 that is connected to source DC lead 104, a gate 124 that is connected to command signal module 112 (shown in FIG. 3), and an emitter 126 that is connected to second solid-state switch 130. Second solid-state switch 130 includes a collector 132 that is connected to emitter 126 of first solid-state switch 120, a gate 134 that is connected command signal module 112 (shown in FIG. 3), and emitter 126 that is connected to both fourth solid-state switch 150 and AC phase lead 106A. Midpoint DC lead 104B is connected to both emitter 126 of first solid-state switch 120 and collector 132 of second solid-state switch 130 through a diode 160. Diode 160 is arranged to oppose current flow from both emitter 126 of first solid-state switch 120 and collector 132 of second solid-state switch 130 to midpoint DC lead 104B.

Third solid-state switch 140 includes an emitter 146 that is connected to return DC lead 104C, a gate 144 that is connected command signal module 112 (shown in FIG. 3), and a collector that is connected to fourth solid-state switch 150. Fourth solid-state switch 150 includes a collector 152 that is connected to both emitter 136 of second solid-state switch 130 and AC phase lead 106A, a gate 154 that is connected to command signal module 112 (shown in FIG. 3), and an emitter 126 that is connected to collector 142 of third solid-state switch 140. Midpoint DC lead 104B is connected to both emitter 156 of fourth solid-state switch 150 and collector 142 of third solid-state switch 140 through a diode 170. Diode 170 arranged to oppose current flow from midpoint DC lead 104B and both emitter 156 of fourth solid-state switch 150 and collector 142 of third solid-state switch 140.

Figure 4B:
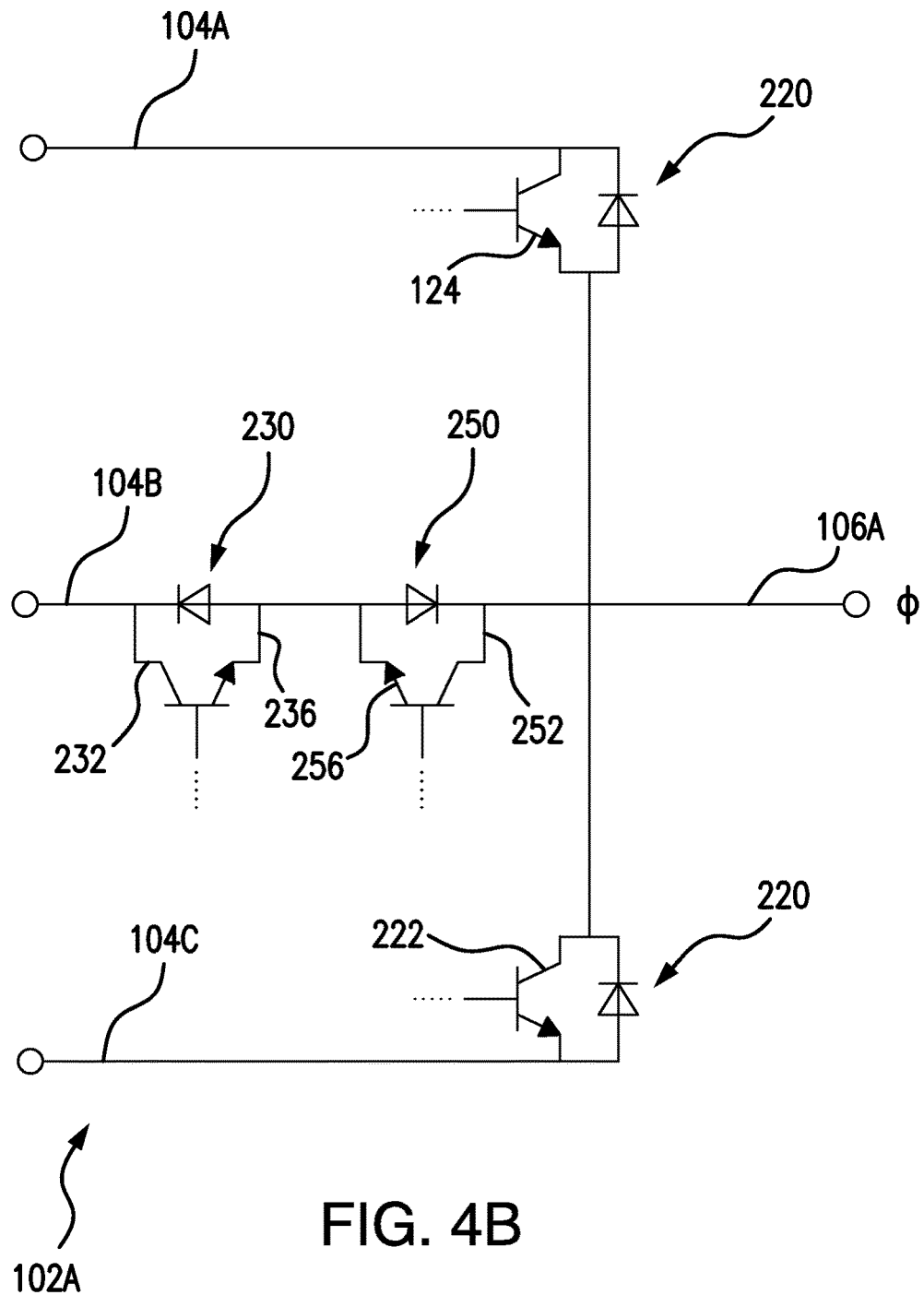

With reference to FIG. 4B, a phase leg according to another embodiment is generally referred to with reference numeral 202A. Phase leg 202A is similar to phase leg 102A (shown in FIG. 4A) with the difference that second solid-state switch 230 and fourth solid-state switch 250 are arranged in series with one another between midpoint DC lead 104B and AC phase lead 106A. Emitter 226 of second solid-state switch 220 is connected to midpoint DC lead 104B, and a collector 222 of second solid-state switch 220 is connected to a collector 252 of fourth solid-state switch 150. An emitter 256 of fourth solid-state switch 250 is connected to each of AC phase lead 106A, emitter 226 of first solid-state switch 120, and a collector 242 of second solid-state switch 240.

Figure 4C:
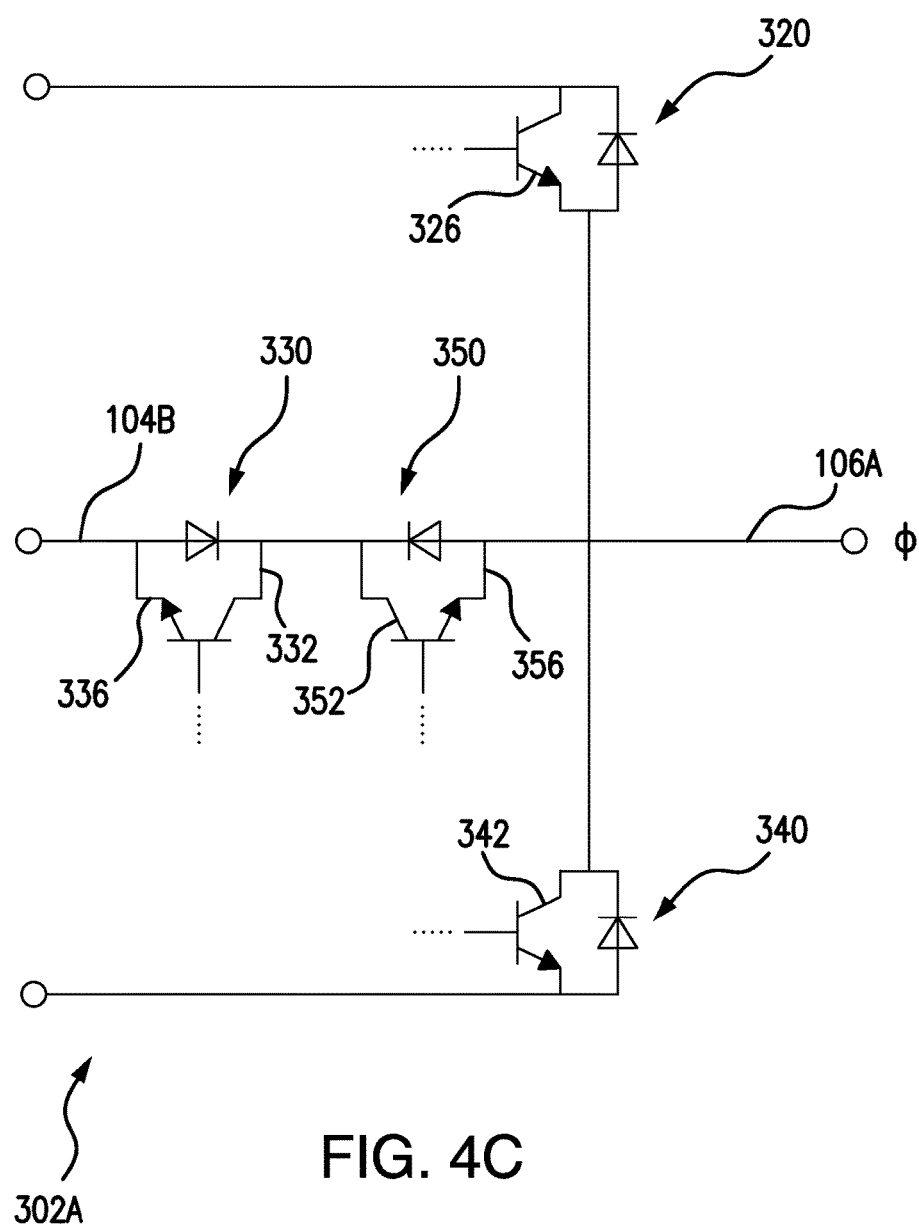

With reference to FIG. 4C, a phase leg according to yet another embodiment is generally referred to with reference numeral 302A. Phase leg 302A is similar to phase leg 202A (shown in FIG. 4B) with the difference that an emitter of second solid-state switch 330 is connected to midpoint DC lead 104B, a collector 332 of second solid-state switch 330 is connected to a collector 352 of fourth solid-state switch 350, and an emitter 356 of fourth solid-state switch 350 is connected to each of AC phase lead 106A, an emitter of first solid-state switch 320, and a collector 342 of third solid-state switch 340.

Figure 4D:
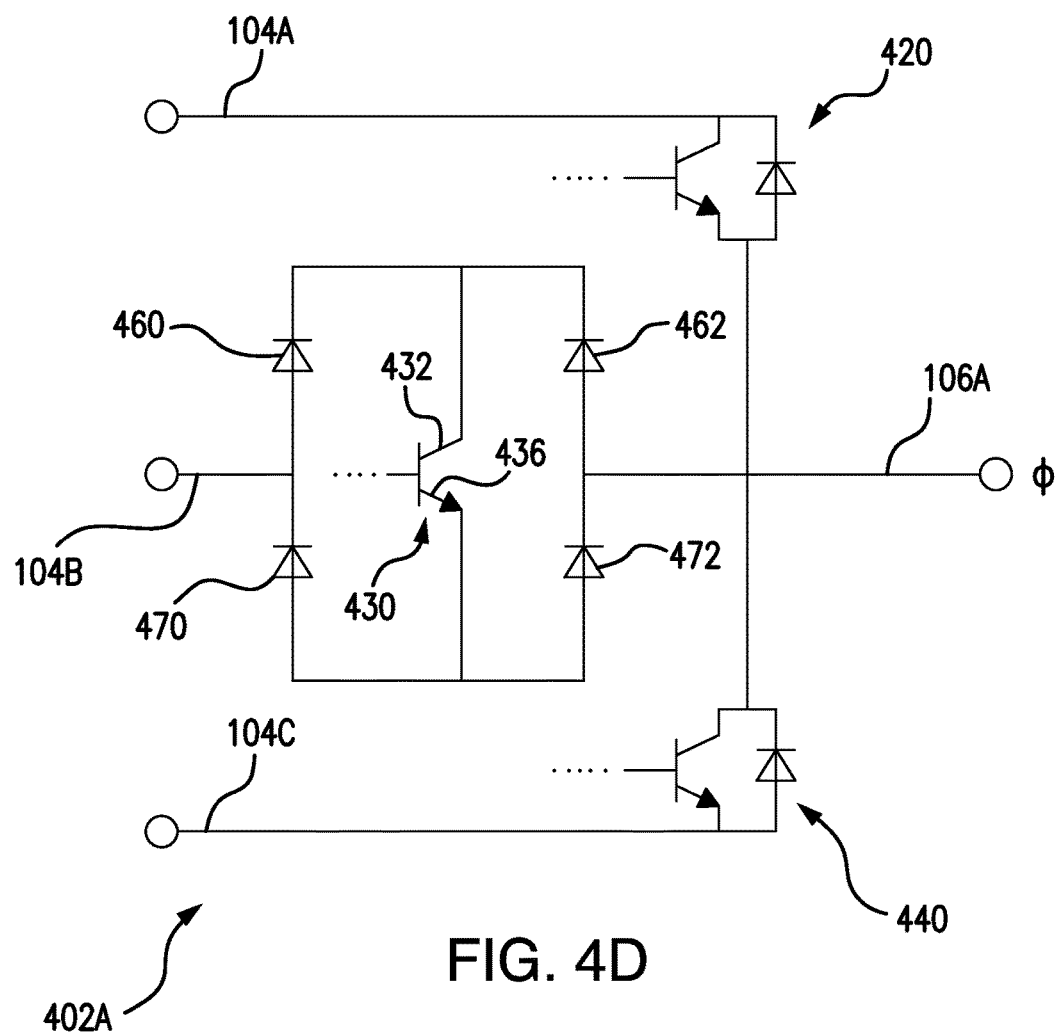

With reference to FIG. 4D, a phase leg according to still another embodiment is generally referred to with reference numeral 402A. Phase leg 402A is similar to phase leg 102A (shown in FIG. 4A) with the difference that phase leg 402A has only three solid-state switches and four diodes. In this respect phase leg 402A includes a second solid-state switch connected by diode pairs between midpoint DC lead 104B and AC phase lead 106A. A first diode 460 is connected between midpoint DC lead 104B and a collector 432 of second solid-state switch 430, and is arranged to oppose current flow from collector 432 to midpoint DC lead 104. A second diode 462 is connected between AC phase lead 106A and collector 432 of second solid-state switch 430, and is arranged to oppose current flow from collector 432 to AC phase lead 106A. A third diode 470 is connected between midpoint DC lead 104B and an emitter 436 of second solid-state switch 430, and is arranged to oppose current flow from midpoint DC lead 104B. A fourth diode 472 is connected between AC phase lead 106A and emitter 436 of second solid-state switch 430, and opposes current flow from AC phase lead 106A to second solid-state switch 430.

Figure 5A:
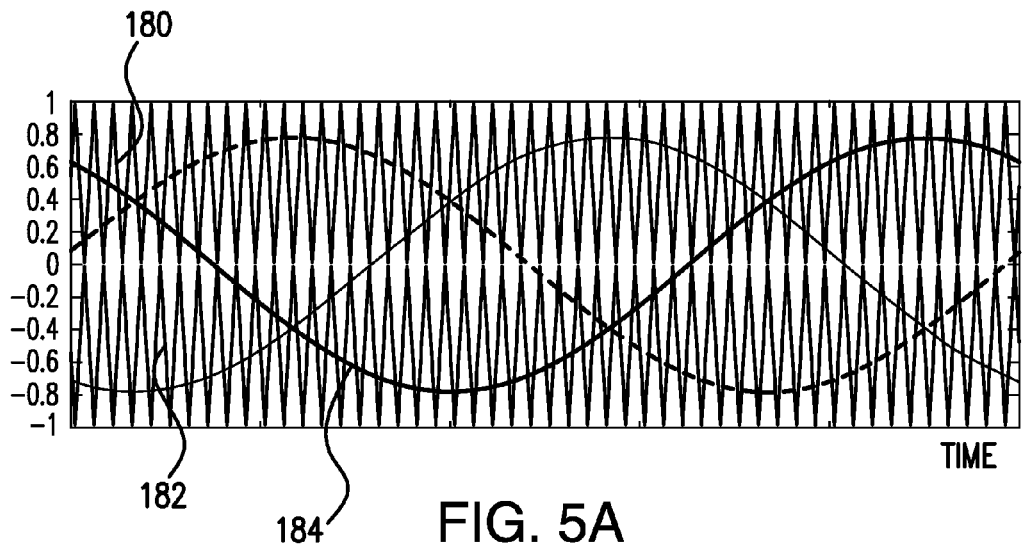
FIGS. 5A-5C are graphs of triangle waves, a reference wave, command signals, and output AC power, respectively, of the three-level inverter of FIG. 4, showing ripple in AC power provided to a starter generator using a phase opposite disposition (POD) modulation technique.
Figure 5B:
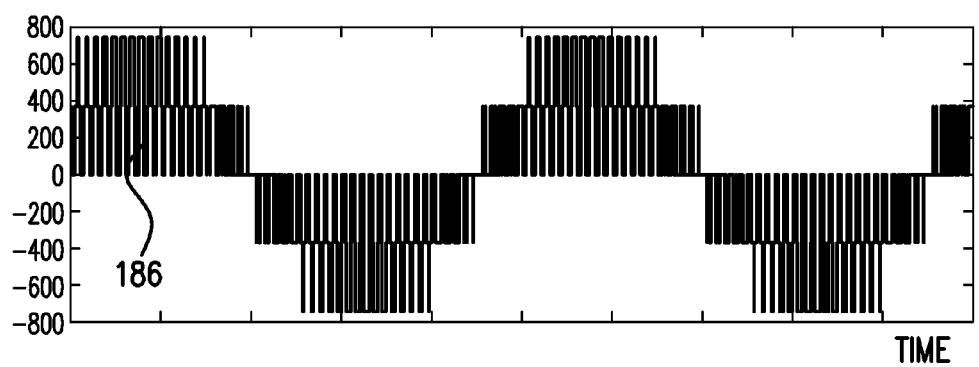
Figure 5C:
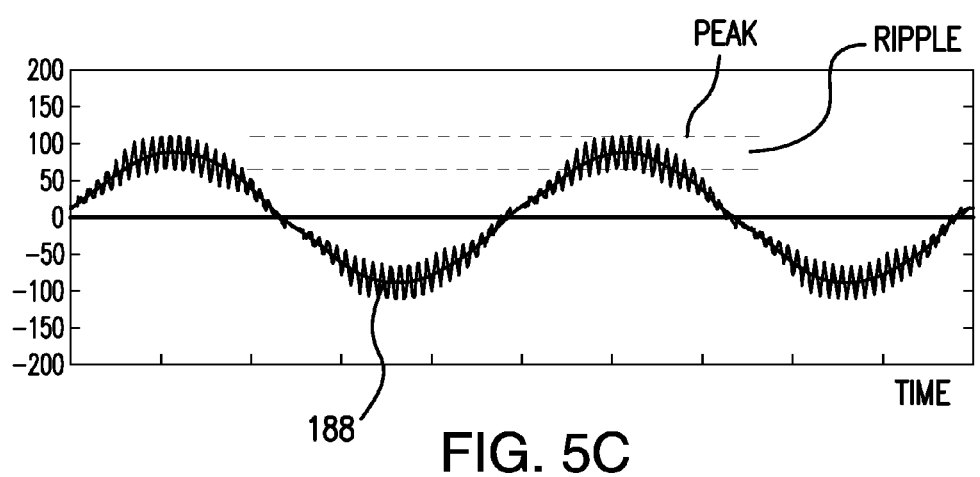

Referring now to FIGS. 5A-5C, carrier waveform module 108 (shown in FIG. 3) generates an upper triangle waveform 180 and a lower triangle waveform 182 (both shown in FIG. 5A), and provides each to command signal module 112 (shown in FIG. 3). Reference wave module 110 (shown in FIG. 3) generates a phase reference waveform 184, and provides phase reference waveform 184 to command signal module 112. Command signal module 112 compares phase reference waveform 184 to both upper triangle waveform 180 and lower triangle waveform, and derives therefrom, using a predetermined modulation algorithm, switch command signals 186 (shown in FIG. 5B). Switch command signals 186 open and close solid-state switches of exemplary start inverter phase leg 102A to generate output AC power 188 (shown in FIG. 5C) corresponding to phase reference waveform 184.

Figure 6A:
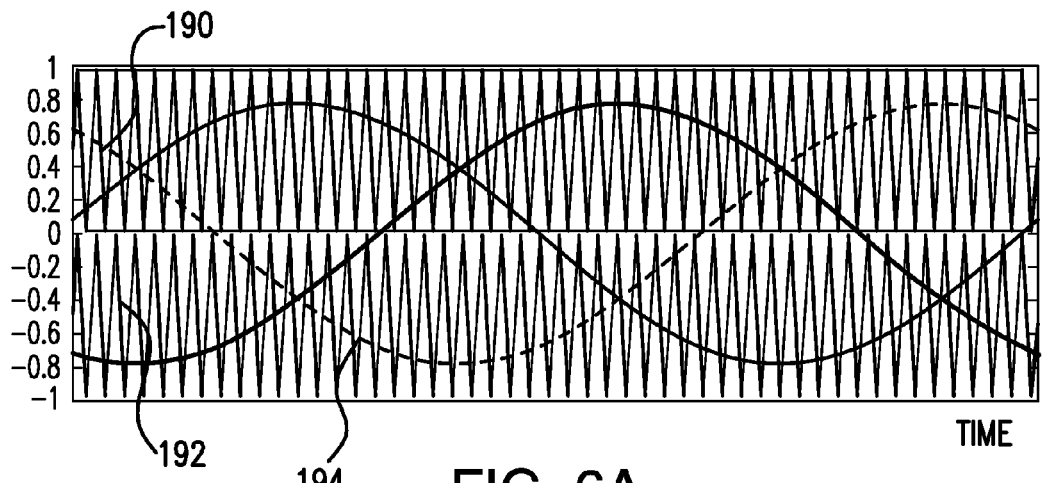
FIGS. 6A-6C are graphs of triangle waves, a reference wave, command signals, and output AC power, respectively, of the three-level inverter of FIG. 4, showing ripple in AC power provided to a starter generator using a phase disposition (PD) modulation technique.
Figure 6B:
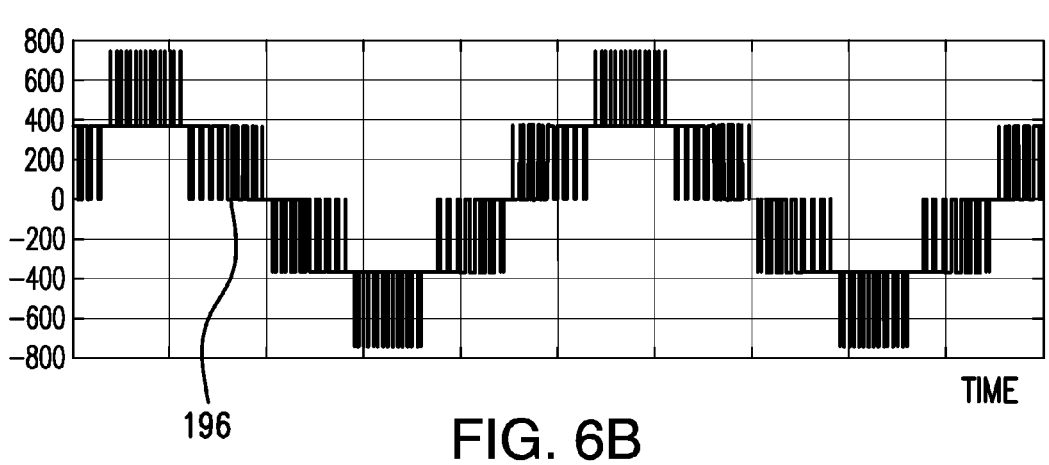
Figure 6C:
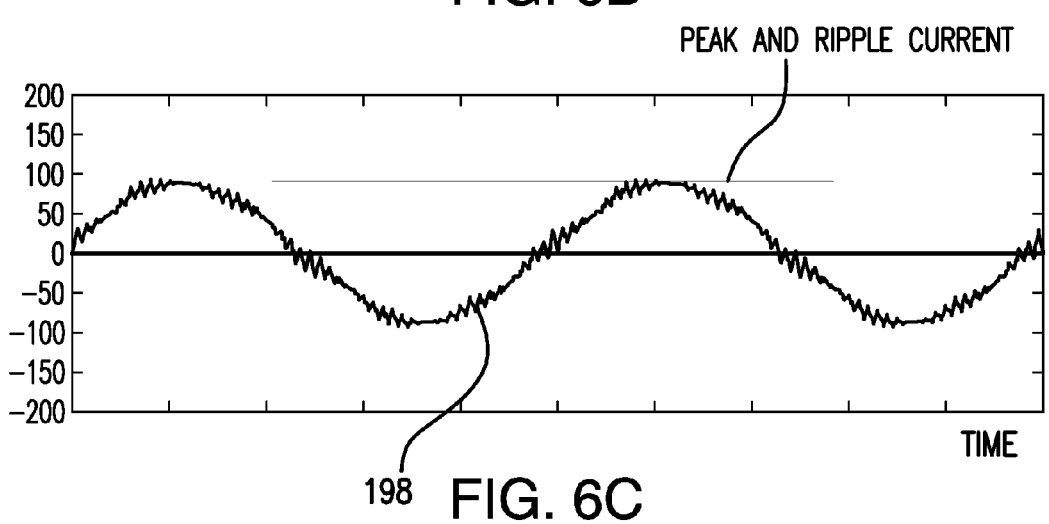

With reference to FIGS. 6A-6C, in another embodiment, carrier waveform module 108 (shown in FIG. 3) can generate an upper triangle waveform 190 and a lower triangle waveform 192 (both shown in FIG. 6A) that are offset from one another in time relative to one another and relative to a phase reference waveform 194. Carrier waveform module 108 provides upper triangle waveform 190 and lower triangle waveform 192 to command signal module 112 (shown in FIG. 3). Command signal module 112 compares upper triangle waveform 190 and lower triangle waveform 192 with phase reference waveform 194 derives therefrom switch command signals 196 (shown in FIG. 6B) according to a phase disposition (PD) modulation technique.

Figure 7:
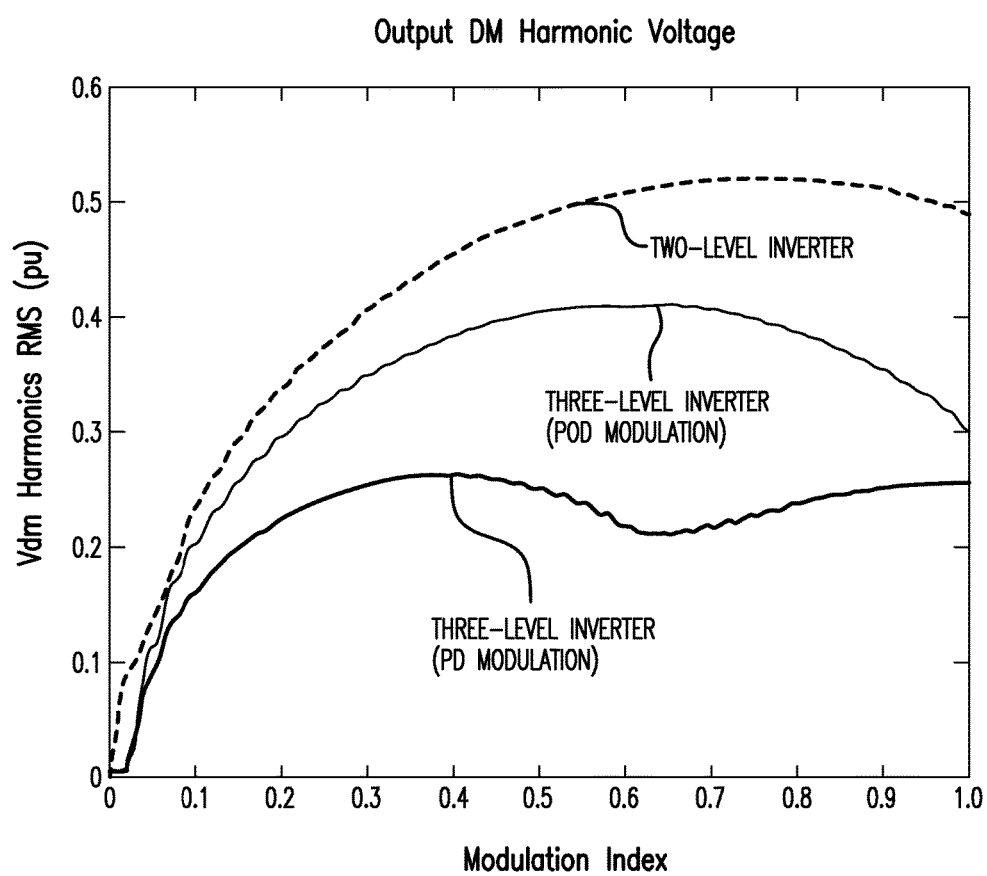
FIG. 7 is a chart comparing differential mode harmonics of two-level, three-level PD modulation, and three-level POD modulation.

PWM 104 provides switch command signals 196 to solid-state switch devices of a start inverter, e.g. phase leg 102A such that output AC power 198 (shown in FIG. 6C) is applied to AC phase lead 106A (shown in FIG. 3). Output AC power 198 has substantially no ripple at peaks of the waveform. Having no ripple at the peaks of output AC power 198, the fundamental wave peak can be substantially equivalent to the current rating of start inverter. In embodiments, this allows for maximizing torque producing output power from a start inverter to a starter-generator, e.g. starter-generator 12 (shown in FIG. 3). As shown in FIG. 7, the differential-mode voltage harmonics generated by three-level start inverters can, in embodiments, be lower than that of a conventional two-level inverter. In certain embodiments, differential-mode voltage harmonics produced using a three-level PD modulation technique can be less than the differential-mode voltage harmonics produced using a three-level POD modulation technique.

Figure 8:
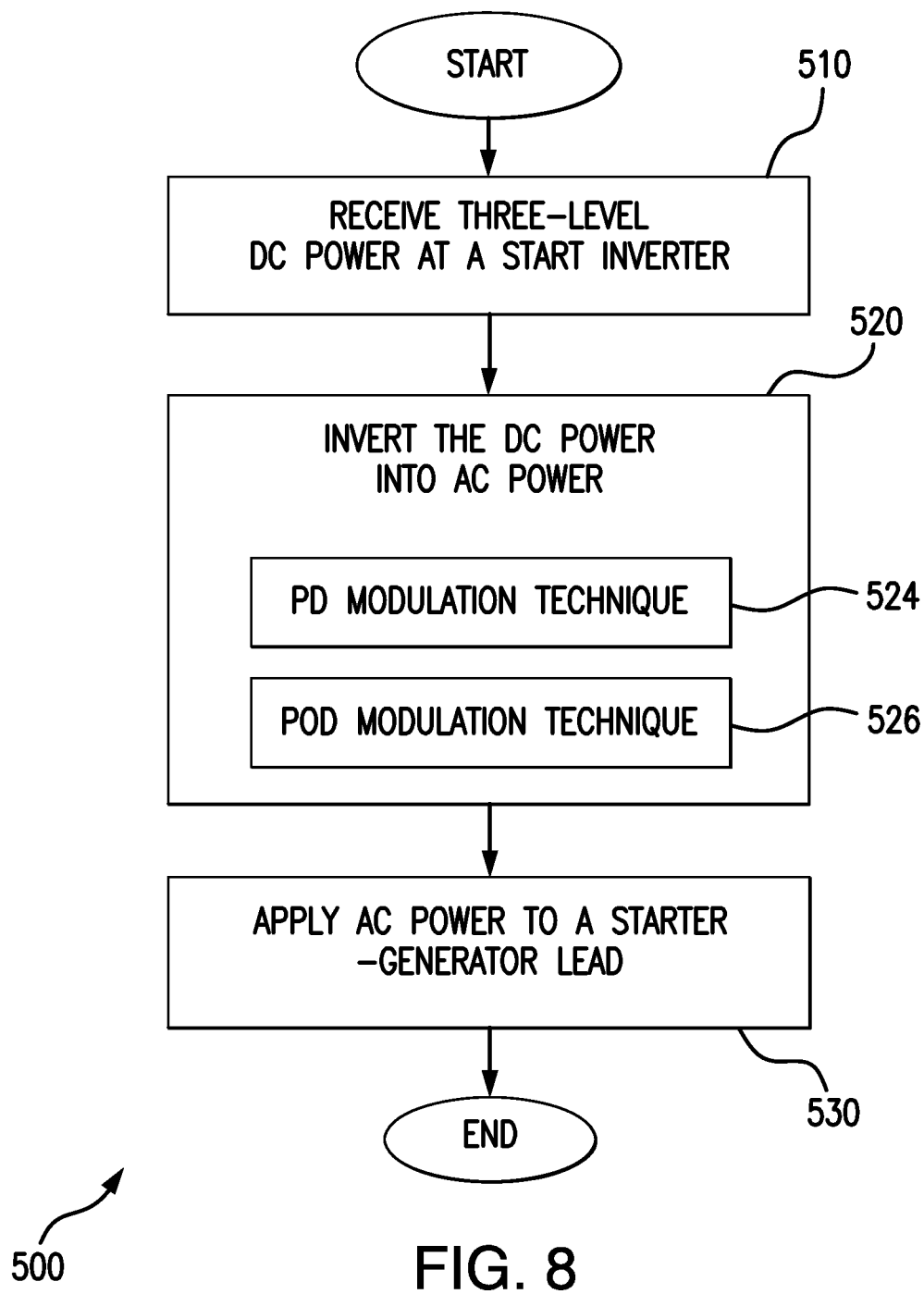
FIG. 8 is a flow chart showing an embodiment of a method of three-level DC power into AC power using a start inverter.

With reference to FIG. 8, a method of providing power to a starter-generator for a gas turbine engine is generally indicated by reference numeral 500. Method 500 includes receiving three-level DC power at a start inverter for a gas turbine engine, as shown with box 510. Method 500 also includes inverting the received three-level DC power into AC power, as shown with box 520. Inverting the received three-level DC power can include inverting the three-level DC power using a plurality of carrier waves, e.g. upper and lower triangle waves 180 and 182 (shown in FIG. 5A) or upper and lower triangle waves 190 and 192 (shown in FIG. 6A). Inverting the three-level DC power can include using a PD or POD modulation technique to generate command signals for solid-state switch devices of phase legs of a multilevel start inverter, e.g. three-level start inverter 100 (shown in FIG. 3). Thereafter, the AC power can be applied to an AC lead coupled to a starter-generator, e.g. starter-generator 12 (shown in FIG. 3). It is contemplated that, in embodiments, the ripple current of the output AC power can be substantially reduced. In certain embodiments, the peak current of the output AC power can be substantially equivalent to the fundamental current of the output AC power a fundamental current maxima and/or minima of the fundamental current waveform.

The methods and systems of the present disclosure, as described above and shown in the drawings, provide for start inverters with superior properties including reduced ripple current flows at the peak fundamental current flows. While the apparatus and methods of the subject disclosure have been shown and described with reference to preferred embodiments, those skilled in the art will readily appreciate that changes and/or modifications may be made thereto without departing from the scope of the subject disclosure

What is claimed is:

1. A start inverter for a gas turbine engine, comprising:
   a direct current (DC) link having a source DC lead, a midpoint DC lead, and a return DC lead;
   a multilevel inverter having an A-phase leg, a B-phase leg, and C-phase leg, each phase leg being connected to the DC link to receive DC power therefrom, each phase leg having at least three solid-state switches;
   a starter-generator connected to the A-phase leg, the B-phase leg, and the C-phase leg to receive alternating current (AC) power from the multilevel inverter; and
   a pulse width modulator operatively connected to the inverter phase legs, wherein the pulse width modulator is configured to:
      invert DC power into AC power having a sinusoidal waveform with a maxima, the maxima of the sinusoidal waveform being defined by a first amplitude of a fundamental sinusoid and a first amount of ripple;
      shift ripple within the sinusoidal waveform such that the maxima of the sinusoidal waveform is defined by a second amount of ripple, the second amount of ripple being smaller than the first amount of ripple; and
      increase amplitude of the fundamental sinusoid to a second amplitude, wherein a second amplitude of the fundamental sinusoid is greater than the first amplitude of the fundamental sinusoid for increasing start torque applied to the start-generator for a given start inverter current rating when starting a gas turbine engine.

2. The start inverter as recited in claim 1, wherein the pulse width modulator has at least one carrier wave module, a reference wave module, and a command signal module, wherein the command signal module is configured to generate the command signals by comparing a reference wave received from the reference wave module to at least first and second carrier waves received from the carrier wave module.

3. The start inverter as recited in claim 1, where the pulse width modulator includes a phase disposition module (PD) configured to generate the command signals.

4. The start inverter as recited in claim 1, where the pulse width modulator includes a phase opposition (POD) disposition module configured to generate the command signals.

5. The start inverter as recited in claim 1, further including:
   an AC lead connected to each of the at least three solid-state switches;
   a source DC lead connected to the AC lead through a first of the solid-state switches;
   a midpoint DC lead connected to the AC lead through a second of the solid-state switches; and
   a return DC lead connected to the AC leg through a third of the solid-state switches devices, wherein the first and second solid-state switches are connected in series between the source DC lead and the AC lead.

6. The start inverter as recited in claim 5, wherein an emitter of the first solid-state switch is connected to a collector of the second solid-state switch, and further including a diode connected between the midpoint DC lead and both the emitter of the first solid-state switch and the collector of the second solid-state switch.

7. The start inverter as recited in claim 5, further including a fourth solid-state switch connected in series between the second solid-state switch and the third solid-state switch.

8. The start inverter as recited in claim 7, wherein an emitter of the fourth solid-state switch is connected to a collector of the third solid-state switch, and further including a diode connected between the midpoint DC lead and both the emitter of the first solid-state switch and the collector of the second solid-state switch.

9. The start inverter as recited in claim 1, further including:
   an AC lead connected to each of the at least three solid-state switches;
   a source DC lead connected to the AC lead through a first of the solid-state switches;
   a return DC lead connected to the AC lead through a second of the solid-state switches; and
   a midpoint DC lead connected to the AC leg through a third of the solid-state switches devices, wherein the third solid-state switch is connected in series between the midpoint DC lead and the AC lead.

10. The start inverter as recited in claim 9, further including a fourth solid-state switch connected in series between the third solid-state switch and the AC lead.

11. The start inverter as recited in claim 10, wherein an emitter of the third solid-state switch is connected to a collector of the fourth solid-state switch.

12. The start inverter as recited in claim 10, wherein a collector of the third solid-state switch is connected to an emitter of the fourth solid-state switch.

13. The start inverter as recited in claim 9, further including:
   a first diode connected to the midpoint DC lead and arranged to oppose current flow from a second solid-state switch and the AC lead to the midpoint DC lead;
   a second diode connected to the midpoint DC lead and arranged to oppose current flow from the midpoint DC lead to both the second solid-state switch and the AC lead;
   a third diode connected to the AC lead and arranged to oppose current flow both the midpoint DC lead and the second solid-state switch to the AC lead; and
   a fourth diode connected to the AC lead and arranged to oppose current flow from the AC lead into both the solid-state switch and the midpoint DC lead.

14. A method of providing power to a starter-generator for a gas turbine engine, comprising:
    receiving three-level direct current (DC) power at a start inverter;
    inverting the DC power into alternating current (AC) power with a sinusoidal waveform having a maxima, wherein the maxima is defined by a first amplitude of a fundamental sinusoid and a first amount of ripple;
    shifting ripple within the sinusoidal waveform such the maxima of the sinusoidal waveform has a second amount of ripple, the second amount of ripple being smaller than the first amount of ripple;
    increasing amplitude of the fundamental waveform to a second amplitude, wherein the second amplitude of the fundamental waveform is greater than the first amplitude of the fundamental waveform; and
    applying the AC power to a starter-generator lead.

15. The method as recited in claim 14, wherein inverting DC power into AC power includes comparing a reference wave to a plurality of carrier waves to generate command signals for solid-state switches of an inverter stage.

16. The method as recited in claim 15, wherein inverting DC power into AC power includes applying a phase disposition (PD) modulation technique to derive the command signals.

17. The method as recited in claim 15, wherein inverting DC power into AC power includes applying a phase opposition disposition (POD) modulation technique to derive the command signals.

18. The method as recited in claim 14, wherein the second amplitude of the fundamental waveform is equivalent to the maxima of the sinusoidal waveform.

19. The method as recited in claim 14, wherein the maxima defined by the first amplitude of the fundamental waveform and the first amount of ripple is about the same as the second amplitude of the sinusoidal waveform.

* * * * *